G. ALEXANDER AND J. J. RAFFERTY.
ELECTRICALLY HEATED WATER SERVICE AND SYSTEM.
APPLICATION FILED SEPT. 26, 1918.

1,357,019.

Patented Oct. 26, 1920.

INVENTORS:
George Alexander
James J. Rafferty
By John O. Seifert
ATTY.

UNITED STATES PATENT OFFICE.

GEORGE ALEXANDER, OF NORTHCOTE, AND JAMES J. RAFFERTY, OF HAWTHORN, VICTORIA, AUSTRALIA, ASSIGNORS TO ALEXANDER EATON WOODS, OF MELBOURNE, VICTORIA, AUSTRALIA.

ELECTRICALLY-HEATED WATER SERVICE AND SYSTEM.

1,357,019.     Specification of Letters Patent.     Patented Oct. 26, 1920.

Application filed September 26, 1918. Serial No. 255,841.

*To all whom it may concern:*

Be it known that we, GEORGE ALEXANDER, residing at 71 Pender street, Northcote, in the State of Victoria, Commonwealth of Australia, and JAMES JOSEPH RAFFERTY, residing at 67 Mason street, Hawthorn, in the State of Victoria, aforesaid, both subjects of the King of Great Britain, have invented new and useful Improvements in and Relating to Electrically-Heated Water Services and Systems, of which the following is a specification.

This invention relates to electrical heating units and is specially applicable for use with all forms of liquid heating appliances, such for instance as hot water services and systems, and provides a heating system that is economical to install, is durable and highly efficient in use.

The improvements comprising the present invention are particularly adapted for heating the water services of kitchens, bathrooms and the like, or to other systems in which hot water is required at short notice.

A salient feature of the invention resides in the provision of a heating unit consisting of a plurality of electrcally heated elements arranged within parallelly disposed compartments which are spaced at short distances apart to allow of water circulation therebetween. These compartments extend between and are integrally united to closed end boxes in which the leads or wires of the units are collected and twisted to form electrical conductors. The end boxes are filled with a heat absorbing and electrical insulating substance or material, such as oil or sand.

If oil is used for the filling of the end boxes the invention provides means whereby the same may permeate through the compartments and completely surround the heating units. With this arrangement provision is also made for the escape of air and to allow for free expansion of the contained oil.

In order that the invention may be readily understood reference will now be had to the accompanying explanatory drawings wherein:—

Figure 1:
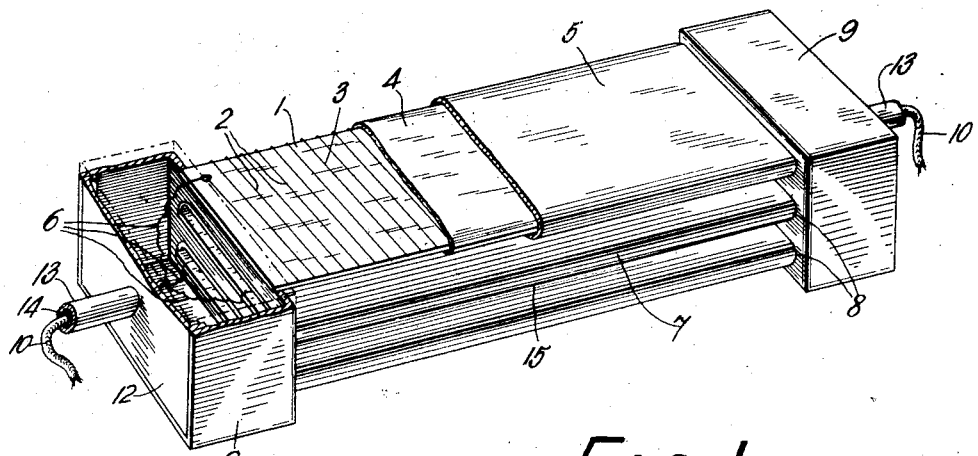
Figure 1 is a view in perspective of an electrical heating unit wherein parts are shown in section for the purpose of clearer illustration.

In these drawings like characters of reference denote the same or corresponding parts and the numeral 1 designates a sheet of insulating material, preferably mica, which forms a core upon and around which is wound from end to end fine wire 2 having a high electrical resistance. The successive turns of wire 2 are spaced regularly and parallelly at short intervals apart, thereby forming a flattened coil 3.

On each side of the coil 3 so made an insulating cover 4 of mica or the like is placed and around the whole is wrapped a metal casing 5. Holes 4ª can be made through said cover 4 to permit of oil circulation as hereinafter described. This casing 5 is preferably made of sheet copper and is folded around and pressed tightly down upon the cover 4. The ends of the sheet of copper forming said casing 5 are placed the one upon the other to form a lap or other suitable joint and are firmly united together as by brazing.

The ends 6 of the coil 3 of wire 2 extend from the opposite ends of the completed heating elements 7 so made and are connected to the source of electric supply.

To construct a heating element made from a plurality of such elements 7, slots 8 are made in the bottoms of two boxes 9 into which the ends of the said elements 7 are inserted and integrally united to the boxes 9 as by brazing.

Figure 3:
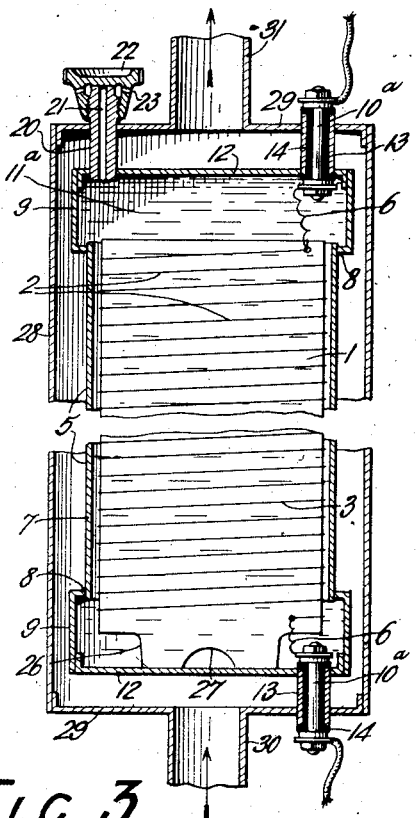
Fig. 3 is a view in vertical section of an electrical heating unit surrounded by a water jacket.
Figure 4:
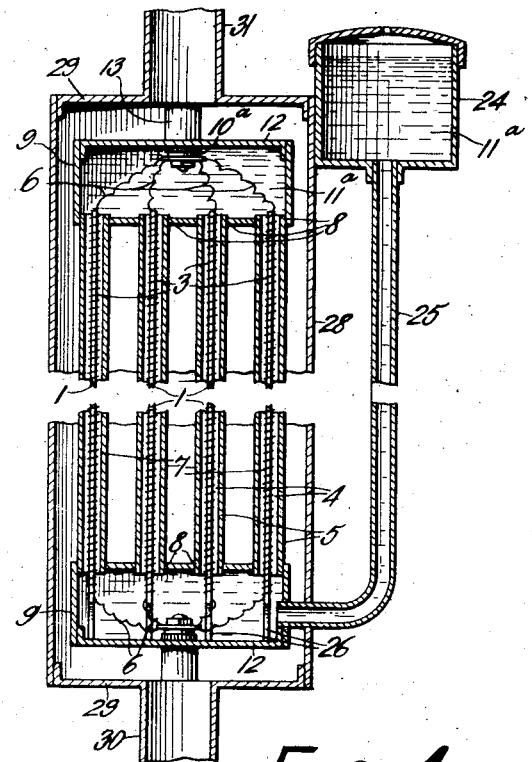
Fig. 4 is a view in vertical section of an oil filled electrical heating unit inclosed in a water jacket and provided with means for free expansion of the oil.
Figure 5:
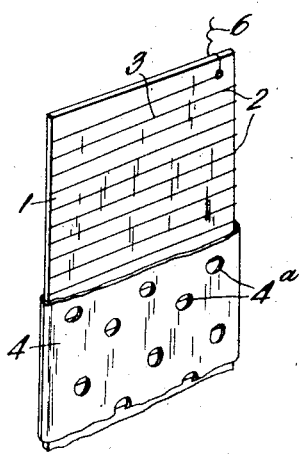
Fig. 5 is a view in perspective of a portion of an element of an oil filled heating unit.

The ends 6 of the coils 3 projecting from the ends of the said heating elements 7 within the end boxes 9 are collected and twisted together to form single electrical conductors 10 which are covered with suitable insulating material as shown in Fig. 1. If preferred the ends 6 of said coils 3 can be attached to insulated terminals 10ª as shown in Figs. 3 and 4, which are connected to the electric supply mains. The end boxes 9 are then filled with fine dry sand 11 or oil 11ª and lids or covers 12 are placed upon the boxes 9 and securely fitted thereto.

Tubes 13 of required length are fitted to the covers 12 to form conduits through which are passed the insulated conductors 10 or terminals 10ª leading to the resistance coils 3. The outer ends of said conductors 10 are connected by suitable leads (not shown) to the supply circuits.

The tubes 13 are plugged as at 14 with insulating material in order to prevent loss of sand 11 or oil 11ª from the boxes 9 and in order to effectively prevent entrance of air thereto.

One or more elements 7, boxes 9 and electrical conductors 10 or terminals 10ª above described form a heating element 15, and a water-heater can be constructed containing a single unit 15 or a plurality of said units.

The elements 7, when assembled as described to form a heating unit, are arranged parallelly to each other at short distances apart, the narrow spaces therebetween being adapted for circulation of water which becomes rapidly heated.

Figure 2:
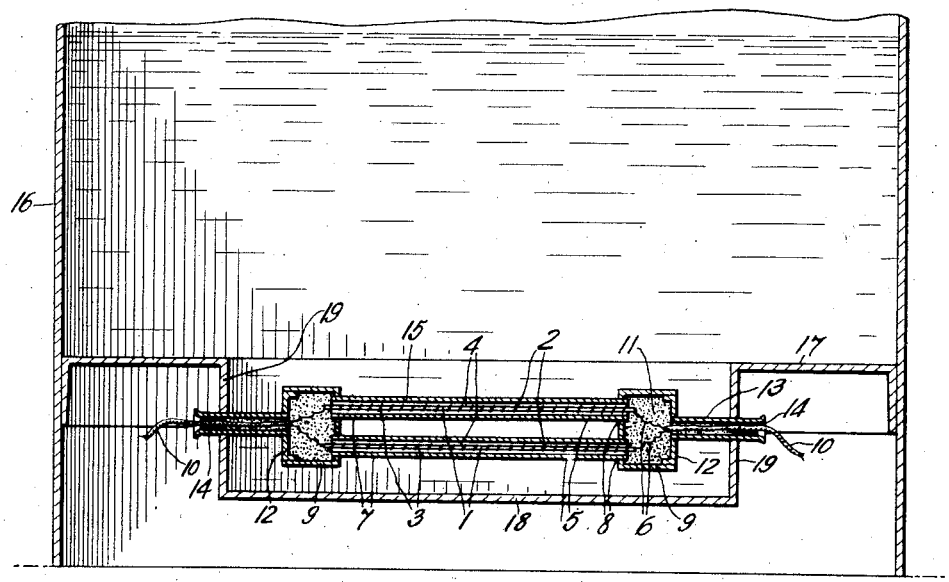
Fig. 2 is a view in vertical section illustrating an application of the unit, shown in Fig. 1, to a water cistern.

The units 15 can be arranged in the water-heater in any approved way, and a preferred construction of heater, shown in Fig. 2, comprises a cistern 16 of desired size and shape wherein the water to be heated is contained. The bottom 17 of the cistern 16 is provided with a central depression to form a well 18.

A heating unit or heating units 15 is or are arranged transversely across the well 18 and the tubes 13 are extended through the sides 19 of said well 18 and are fixed firmly therein as by soldering.

When the unit 15 is to be filled with oil it is essential that air contained therein and displaced by the oil be allowed to escape. This function is preferably accomplished by means of the special form of air-tight plug 20 illustrated in Fig. 3. This plug 20 is provided with an axial passage 21 which is normally closed by a cap 22 screw-threaded to fit the upper end of said plug 20. One or more radial holes 23 are made in the sides of the cap 22 and these holes 23 permit the air displaced by the oil to readily escape when said cap 22 is screwed away from the end of the plug 20.

The heating unit 15 is kept constantly full of oil by means of a reservoir 24 situated somewhat above the upper end of said unit 15, and the oil in this reservoir 24 gravitates through a pipe 25 to the lower end of the unit 15. When the units 15 are arranged vertically and filled with oil the cores 1 of insulating material rest upon the lower covers 12 and the vertical edges of said cores 1 are cut away as at 26 and gaps or openings 27 are made therein to permit of the free circulation of oil in said unit 15.

The oil in the heating unit 15 forms an insulating medium between the turns of said coils 3 and effectively excludes air from the heating elements 7, thereby preventing oxidization of the wire 2. Moreover, the oil by its heat absorbing properties and its circulation readily transmits heat to the walls of the compartments through which it is conducted to the surrounding water.

The unit 15 or units 15 can be fixed within a jacket 28 provided with end covers 29 integrally united therewith and the conducting tubes 13 can be extended through the same or opposite ends of the jacket 28, as shown in Figs. 3 and 4 and said tubes 13 can be integrally united with the jacket 28 as by soldering.

Water enters the lower end of the jacket 28 through a pipe 30 and flows upwardly therein and circulates through the narrow spaces between the elements 7. The water in its upward course through the jacket 28 becomes rapidly heated and the hot water flows from said jacket 28 through a pipe 31 fixed to the upper end thereof.

Figure 6:
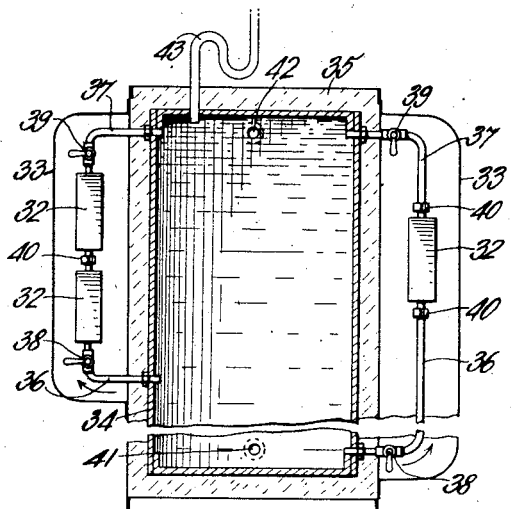
Fig. 6 is a view in vertical section showing an application of a heating unit or heating units to a water cistern.

One or more jacketed heating units 32 can be arranged within compartments 33, as shown in Fig. 6, fixed to the sides of a water cistern 34 which is surrounded by lagging 35 made of approved material which is a bad conductor of heat.

The jacketed units 32 can be arranged in series or in parallel in the compartments 33 and said units at their lower ends are connected by pipes 36 to said cistern 34 and at their upper ends are connected thereto by pipes 37. Taps 38 and 39 are arranged in the pipes 36 and 37, respectively, and these taps can be shut off when the jacketed units 32 are to be removed, by disconnecting unions 40.

The cistern 34 is provided with an inlet for cold water as at 41 and a hot water outlet as at 42. A goose-neck 43 which forms a water seal to release excess pressures from said water cistern 34 is provided at the upper end thereof.

In operation, the water in the jacketed units 32 becomes heated and expands thereby becoming lighter bulk for bulk than the water in the cistern 34. The latter in consequence displaces the heated water from said units 32 which flows through the pipes 37 into the upper end of said cistern 34. Cold water enters the units through the pipes 36 and in turn becomes heated and rises upwardly and returns to the cistern.

A continuous circulation is thereby set up which continues until the water in the cistern 34 is uniformly heated throughout.

When hot water is drawn off through the opening 42 cold water flows in at 41 to make good the deficiency when the circulation will restart as before until the water is again uniformly heated throughout.

The opening 41 can be connected directly to the supply mains, or it can be connected to an auxiliary reservoir which is supplied from the mains through a ball cock or like device.

The coils 3 of the elements 7 are insured a maximum life as they are entirely inclosed and air is excluded therefrom, and the construction and arrangement of the electrical heating units comprising a plurality of elements are such that the removal and replacement of parts, whenever necessary, are facilitated.

What we do claim is:—

1. An electrical heating unit comprising a pair of closed boxes, a compartment integrally connected at opposite ends with said boxes, an electrical heating element in said compartment having its leads extending into the boxes and connected to a source of electric supply exterior of the boxes, and a heat conducting and electrical insulating material filling said boxes.

2. An electrical heating unit comprising a pair of boxes having a filling of heat conducting and electrical insulating material, a plurality of compartments united at opposite ends with said boxes, an electrical heating element in each of said compartments, conduit tubes on said boxes adapted to serve as supports for the heating unit, insulating plugs in said tubes, and leads from said heating elements connected together and leading through said boxes, the conduit tubes and insulating plugs therein for connection with a source of electricity.

3. An electrical heating unit comprising two closed end boxes, a plurality of parallelly disposed narrow compartments having their ends integrally united with said boxes, an electrical heating element in each of said compartments and consisting of a flat core of insulating material, high resistance wire wound upon and around said core forming a flattened coil, an insulating cover around said coil, the resistance coils having extended ends twisted together and inserted in said boxes, fine dry sand or like granular insulating material in said boxes, conduit tubes on said boxes and insulating plugs in said tubes.

4. An electrical heating unit comprising two closed boxes filled with insulating material, a plurality of parallelly disposed compartments having their ends united with said boxes, an electrical heating element in each of said compartments and consisting of a flat core of insulating material, high resistance wire wound upon and around said core forming a flattened coil, a perforated insulating cover around said coil, and electric current conductors having their terminals in said boxes, the ends of the resistance wires of said coils extending into said boxes and being attached to said terminals.

5. In an electrical heating unit a heating element comprising a flat sheet of mica, wire having high electrical resistance wound closely upon and around said flat sheet to form a flattened open heating coil, covers consisting of sheets of mica on the opposite faces of said coil, and a casing consisting of a sheet of copper folded around and tightly pressed upon said covers and having its opposite ends united by brazing; the opposite ends of said resistance wire projecting from the ends of said casing for connection with electrical supply leads, substantially as described.

In testimony whereof we affix our signatures in presence of two witnesses.

GEORGE ALEXANDER.
JAMES J. RAFFERTY.

Witnesses:
A. J. CALLMAN,
JAMES H. ANDERSON.